(12) United States Patent
Zhang et al.

(10) Patent No.: US 8,310,518 B2
(45) Date of Patent: *Nov. 13, 2012

(54) VIDEOCONFERENCE SYSTEM AND MANAGEMENT METHOD THEREOF

(75) Inventors: Liquan Zhang, Shenzhen (CN); Jianqing Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

This patent is subject to a terminal disclaimer.

(21) Appl. No.: 12/697,775

(22) Filed: Feb. 1, 2010

(65) Prior Publication Data

US 2010/0134589 A1 Jun. 3, 2010

Related U.S. Application Data

(63) Continuation of application No. 10/578,761, filed as application No. PCT/CN2004/001150 on Oct. 11, 2004, now Pat. No. 7,683,923.

(30) Foreign Application Priority Data

Nov. 5, 2003 (CN) .......................... 2003 1 0113933

(51) Int. Cl.
*H04M 11/00* (2006.01)
(52) U.S. Cl. ..................................... 348/14.01; 370/265
(58) Field of Classification Search .... 348/14.01–14.08, 348/14.09, 14.12; 370/352, 338, 260, 401
See application file for complete search history.

(56) References Cited

U.S. PATENT DOCUMENTS

| | | | |
|---|---|---|---|
| 5,751,338 A | 5/1998 | Ludwig, Jr. | |
| 5,933,417 A * | 8/1999 | Rottoo | 370/260 |
| 6,020,915 A * | 2/2000 | Bruno et al. | 348/14.09 |
| 6,081,291 A | 6/2000 | Ludwig, Jr. | |
| 6,157,401 A | 12/2000 | Wiryaman | |

(Continued)

FOREIGN PATENT DOCUMENTS

CN 1284816 A 2/2001

(Continued)

OTHER PUBLICATIONS

"Narrow-band Visual Telephone Systems and Terminal Equipment," *International Telecommunication Union (ITU)*, Telecommunication Standardization Sector, ITU-T Recommendation H.320 (May 1999).

(Continued)

*Primary Examiner* — Curtis Kuntz
*Assistant Examiner* — Maria El-Zoobi
(74) *Attorney, Agent, or Firm* — Leydig, Voit & Mayer, Ltd.

(57) ABSTRACT

A videoconference system and a management method thereof are provided. The videoconference system includes: terminals; multipoint control units (MCUs), as the superior level for the terminals, for controlling the corresponding terminals; conference management systems, as the superior level for the MCUs, for performing dispatching and control for the local conference site; and conference coordination systems, as the superior level for the conference management systems, for coordinating corresponding conference management systems and neighboring conference coordination systems to perform dispatching and control for the entire conference. The videoconference management method includes: a subscriber requesting for conference dispatching to the home conference management system; the home conference management system managing the corresponding local conference site directly at the dispatching request, and transferring the dispatching across conference management systems to the corresponding conference coordination system; and the conference coordination system dispatching the corresponding master and slave conference management systems at the dispatching request.

8 Claims, 4 Drawing Sheets

U.S. PATENT DOCUMENTS

| | | | |
|---|---|---|---|
| 6,732,177 | B1 | 5/2004 | Roy |
| 6,859,448 | B1 | 2/2005 | Roy |
| 6,859,449 | B2 | 2/2005 | Gronberg et al. |
| 6,989,856 | B2 * | 1/2006 | Firestone et al. .......... 348/14.09 |
| 7,330,721 | B2 | 2/2008 | Bhatia et al. |
| 7,456,858 | B2 * | 11/2008 | Schrader et al. .......... 348/14.09 |
| 2002/0018476 | A1 | 2/2002 | Roy |
| 2002/0064136 | A1 | 5/2002 | O'Neil |
| 2002/0064149 | A1 | 5/2002 | Elliott et al. |
| 2003/0142635 | A1 | 7/2003 | Roher et al. |
| 2004/0228356 | A1 | 11/2004 | Adamczyk et al. |

FOREIGN PATENT DOCUMENTS

| | | | |
|---|---|---|---|
| CN | 1353544 A | | 6/2002 |
| CN | 1368808 A | | 9/2002 |
| CN | 1404311 A | | 3/2003 |
| CN | 1457198 | * | 11/2003 |
| CN | 1457198 A | | 11/2003 |
| JP | 11-313295 A | | 11/1999 |
| WO | WO 01/35655 A2 | | 5/2001 |

OTHER PUBLICATIONS

"Packet-Based Multimedia Communications Systems," *International Telecommunication Union (ITU)*, Telecommunication Standardization Sector, ITU-T Recommendation H.323 (Jul. 2003).

* cited by examiner

VIDEOCONFERENCE SYSTEM AND MANAGEMENT METHOD THEREOF

CROSS-REFERENCE TO RELATED APPLICATIONS

This application is a continuation of U.S. patent application Ser. No. 10/578,761, filed May 5, 2006, which is a national phase of International Patent Application No. PCT/CN2004/001150, filed Oct. 11, 2004, which claims the benefit of Chinese Patent Application No. 200310113933.3, filed Nov. 5, 2003, all of which are hereby incorporated by reference herein in their entireties.

FIELD OF THE INVENTION

The present invention relates to videoconference technology, more particularly to a videoconference system and a management method thereof.

BACKGROUND OF THE INVENTION

In a videoconference, the participants can hear/see one party, multiple parties, or all other participants by encoding/decoding and transmission of video and audio data. At present, videoconference systems mainly include a narrowband videoconference system that employs ITU-T H.320 Series standard and a VoIP videoconference system that employs H.323 Series standard. Referring to FIG. 1, a videoconference system mainly includes a Multipoint Control Unit (MCU) 1 and terminals 2. MCU 1 can control multiple terminals in the videoconference. Since all video and audio data has to be processed by MCU 1 (sometimes encoding/decoding is also required). The access capability and data processing capability of MCU 1 limit the maximum number of videoconferences supported as well as the maximum number of terminals 2. Furthermore, compared with terminals 2, MCU 1 is more expensive, and thereby is a precious resource in videoconference systems. Therefore, a conference management system is required to perform conference dispatching and allocation of MCU resource.

In general, traditional videoconference systems are oriented to enterprises and private network markets, and the conference management system mainly pertains to either of the following two solutions:

The first solution: The MCU manufacturer provides a local conference management system 41 or a conference management system embedded in MCU 1 for managing terminals 2, as shown in FIG. 2. In this solution, a dedicated administrator has to be assigned for each MCU 1; the subscribers request for conference dispatching to the administrator via network 3 by telephone, fax, or email; the administrator performs dispatching for the corresponding conference in the videoconference system in accordance with the requests from subscribers. If a cascade conference has to be dispatched, the administrator has to determine which terminals 2 are under MCU 1 manually and create cascaded conference sites manually.

The second solution: if there are multiple MCUs 1, usually the conference is managed in a centralized manner, as shown in FIG. 3. That is to say, a dedicated conference management system 43 is used to manage the multiple MCUs 1. Such a videoconference system usually provides a subscription interface, through which the subscribers can request for conference dispatching; the conference management system 43 will accomplish the allocation of MCU 1 resource and the cascading automatically.

SUMMARY OF THE INVENTION

An advantage of the present invention is to provide a videoconference system and a management method thereof, so as to implement dispatching and control of conference management systems across conferences.

A videoconference system according to the embodiment of the present invention includes: (1) terminals; (2) multipoint control units, as the superior level for the terminals, for controlling the corresponding terminals to participate in the videoconference; (3) conference management systems, as the superior level for the multipoint control units, for managing resource allocation of the corresponding subordinate multipoint control units to meet subscribers' demand, and performing conference dispatching and control for the local conference site; and (4) conference coordination systems, as the superior level for the conference management systems, for coordinating corresponding subordinate conference management systems and the neighboring conference coordination systems to perform dispatching and control for the entire conference at a dispatching request.

Each conference coordination system includes: (1) a system management module, for accomplishing system configuration and operating management of the conference coordination system; (2) a conference dispatching module, for processing conference dispatching requests from the subordinate conference management systems or from the neighboring conference coordination systems; (3) a conference control module, for forwarding conference control data; and (4) a multipoint communication module, for communicating with the subordinate conference management systems and the neighboring conference coordination systems.

The multipoint communication data in the multipoint communication module includes source node ID, channel ID, list of destination nodes, upper layer application data and application data segment mark, and the conference coordination systems implement routing strategy by using the channel ID and list of destination nodes in the multipoint communication data.

The system configuration of the system management module includes: (1) the terminals being numbered uniformly; (2) the conference management system being configured with number segments to determine corresponding terminals; and (3) the conference coordination systems being configured with number segments managed by the corresponding conference management systems and number segments managed by the neighboring conference coordination systems, so as to determine a plurality of conference management systems involved in the conference in accordance with the system configuration, split the conference into sub-conferences, and distribute the sub-conferences to each corresponding subordinate conference management system during a videoconference.

During a videoconference, the conference coordination systems determine a master conference management system and a slave conference management system dynamically in accordance with the system configuration and dispatching strategy.

During a videoconference, one of the subordinate multipoint control units managed by the master conference management system serves as the master multipoint control unit, the other multipoint control units in the master conference management system and the multipoint control units in the slave conference management system serve as slave multipoint control units, and the master conference management system accomplishes cascading among the master and slave multipoint control units.

The dispatching strategy of the conference coordination systems is to determine the master conference management system in accordance with the number of terminals managed by the conference management systems and to determine whether to merge the sub-conferences into the master conference management system in accordance with the number of sub-conferences.

The videoconference system management method according to an embodiment of this invention includes the steps of: (1) a subscriber requesting for conference dispatching from the home conference management system; (2) the home conference management system managing the corresponding local conference sites directly at the dispatching request, and transferring the dispatching across conference management systems to the corresponding conference coordination system; and (3) the conference coordination system dispatching the corresponding master and slave conference management systems at the dispatching request.

The dispatching step further includes the steps of: (1) the conference coordination system determining each terminal's home conference management system; (2) the conference coordination system splitting the videoconference into sub-conferences and distributing the sub-conferences to each corresponding conference management system; and (3) the conference coordination system determining a master conference management system and a plurality of slave conference management systems.

Before the step of requesting for conference dispatching, the videoconference system management method further includes the steps of: (1) numbering the terminals in the videoconference uniformly; (2) configuring the conference management systems with number segments to determine corresponding terminals; and (3) configuring the conference coordination systems with number segments managed by the corresponding conference managements system and number segments managed by the neighboring conference coordination systems, so that the conference coordination system can perform dispatching in accordance with the corresponding managed number segments.

The videoconference system management method further includes the following step between the step of managing and transferring of the home conference management system and the dispatching step: the conference coordination system dispatching the corresponding neighboring conference coordination systems.

The videoconference system management method further includes the following steps after the dispatching step: (1) the master and slave conference management systems feeding the dispatching result back to the corresponding conference coordination system; and (2) the conference coordination system feeding the final dispatching result back to the home conference management system that sent the dispatching request.

Compared with the conventional art, the embodiments of this invention have the following advantages: (1) with a distributed and cascaded videoconference management mechanism to implement dispatching across the entire network and the entire videoconference, and thus it can optimize the operator's network configuration, improve equipment utilization, and reduce investment cost; (2) it can implement automatic cascading, hold any large-scale videoconference efficiently and quickly, without any need to designate a dedicated person to perform conference dispatching and control, and thereby can easily implement interconnection across operators and across countries to meet the demand for public videoconference operation; and (3) through conference dispatching by number segments and thresholds of terminals, it can make utilization of MCU and network resources more rational.

BRIEF DESCRIPTION OF THE DRAWINGS

FIG. 2 is the diagram of an embodiment of a conventional videoconference system in the;

FIG. 3 is the diagram of another embodiment of the conventional videoconference system in the;

DETAILED DESCRIPTION OF THE EMBODIMENTS

Figure 1:
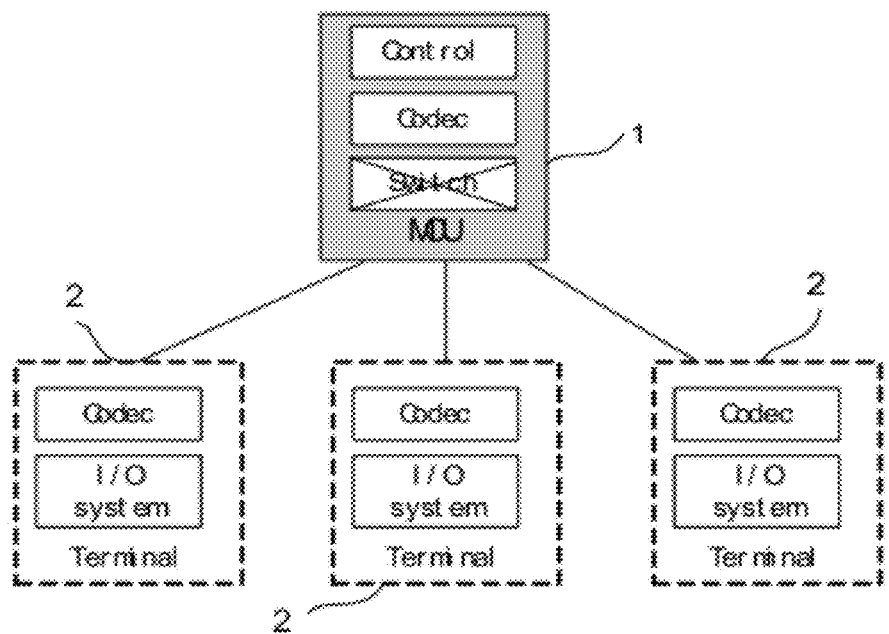
FIG. 1 is the schematic diagram of a videoconference system.
Figure 2:
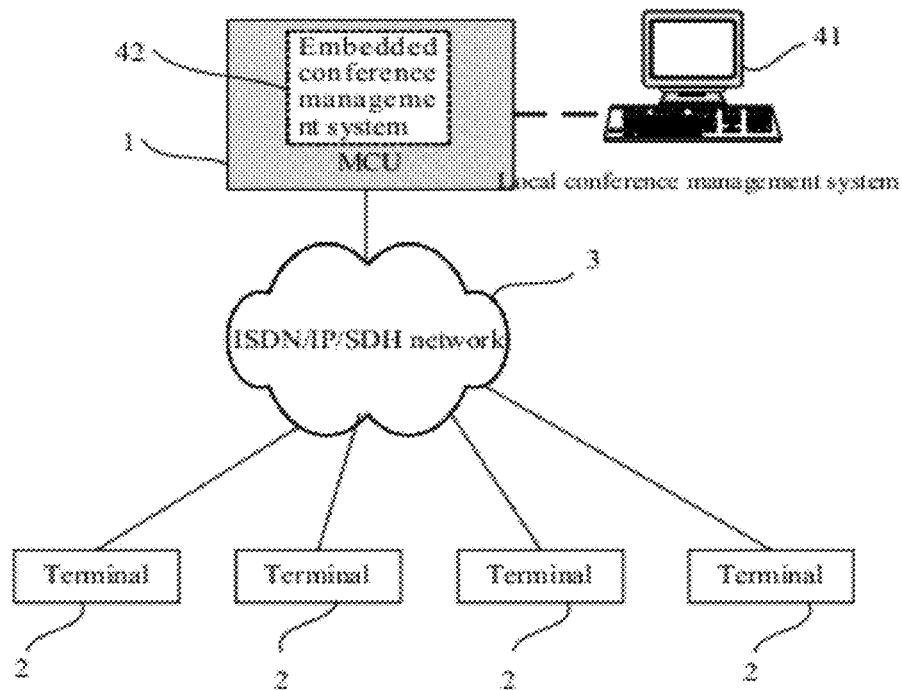
Figure 3:
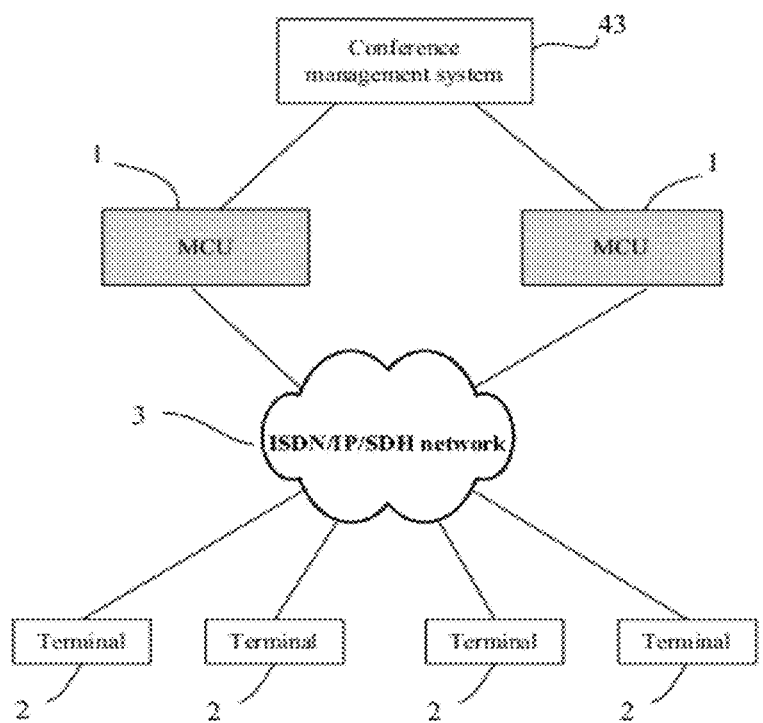

In the videoconference system according to an embodiment of the present invention, a superior conference coordination system is added based on the existing centralized conference management system, so that the isolated videoconference systems are integrated into a videoconference network, in order to take full advantage of the scale merit of the network to meet the demand of the videoconference operation.

The videoconference system according to an embodiment of the present invention is in a tree-type distributed structure and includes: multipoint control units, terminals, conference management systems, and conference coordination systems; in which the terminals refer to network devices that can perform bidirectional and real time communication with the multipoint control units or other terminals. The communication includes control, instructions, voice, moving images, and/or data.

The Multipoint Control Units (MCUs) serve as the superior level for the terminals and controls the corresponding subordinate terminals to participate in the videoconference.

The conference management systems serve as the superior level for the MCUs and are used to manage resource allocation of the corresponding subordinate MCUs to meet subscribers' demand as well as perform conference dispatching and control for the local conference sites (i.e., terminals participating in the conference) during the conference.

The conference coordination systems serve as the superior level for the conference management systems, and are used to coordinate each corresponding subordinate conference management system and neighboring conference coordination systems to perform dispatching and control for the entire conference at the dispatching request.

The conference coordination systems are superior to the conference management systems; each conference coordination system can manage multiple conference management systems; each conference management system communicates with only the corresponding conference coordination system. The conference coordination systems are peer to peer and can request for conference dispatching to each other.

Hereinafter, the dispatching request refers that a subscriber requests for conference dispatching (including start time, duration of the conference and terminals involved in the conference) from the home conference management system, i.e., the conference management system where the account number of the conference caller is.

The conference coordination systems perform control of the conference with conference control data which includes conference state data and conference control commands. Wherein, the conference state data refers to the data reported by each conference management system to the corresponding superior conference coordination system and forwarded by the conference coordination system to other conference management systems, including start/end of conference, entering/leaving of conference site, or change of chairman token; the conference control commands include prolongation/ending of conference, calling/hanging up/adding/deleting/broadcasting/viewing of conference site, setting mode of continuous presence, etc. The conference coordination systems forward conference state data and conference control commands to other conference management systems participating in the videoconference, and record the original bill data for data verification in the settlement between the conference management systems.

Figure 4:
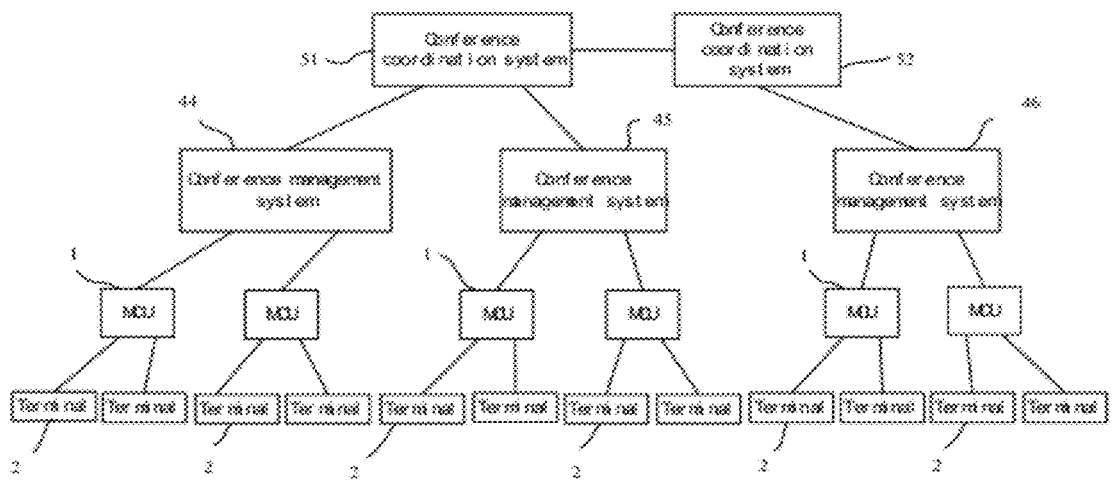
FIG. 4 is the diagram of a videoconference system according to a first embodiment of the present invention.

In the embodiment as shown in FIG. 4, the conference coordination systems are disposed separately. In this case, the videoconference system includes: (1) twenty-two terminals 2; (2) six MCUs 1, which serve as the superior level for terminals 2, and each MCU 1 manages two terminals 2; (3) conference management systems 44, 45 and 46 serving as the superior level for MCUs 1, each of the conference management systems manages two MCUs 1; and (4) conference coordination systems 51 and 52 serving as the superior level for the conference management systems 44, 45, and 46; wherein, the conference coordination system 51 is the superior level for the conference management systems 44 and 45, while the conference coordination system 52 is the superior level for the conference management system 46; the conference coordination systems 51 and 52 are neighboring to each other, and can dispatch each other.

Figure 5:
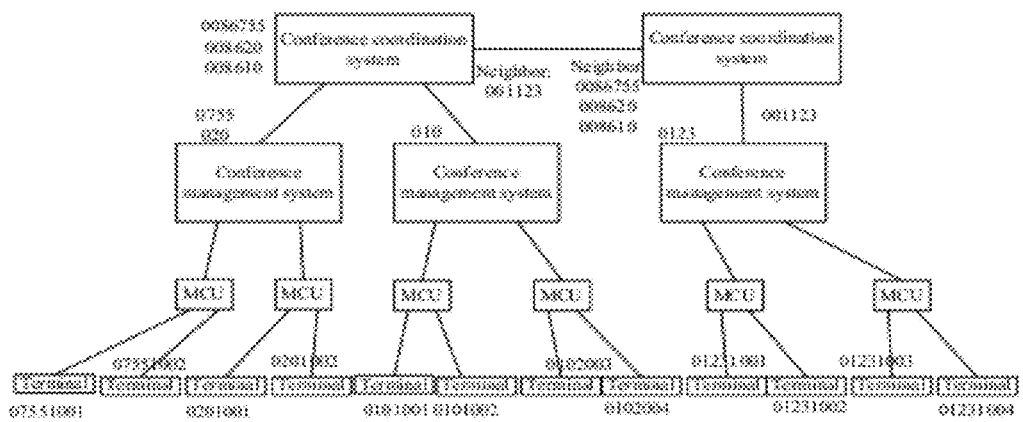
FIG. 5 is the diagram of an embodiment of the solution as shown in FIG. 4.

In order to enable the conference coordination systems to coordinate each corresponding subordinate conference management system and the neighboring conference coordination systems to perform dispatching and control of the entire conference in accordance with dispatching requests, conference control data and dispatching strategy, the entire videoconference system is configured uniformly. The conference coordination systems need to determine each terminal's home conference management system. In this embodiment, the terminals are configured similar to telephone numbers, as shown in FIG. 5:

The terminals in the videoconference system are configured with numbers uniformly (e.g., in E.164 code). For example, the twelve terminals are configured with numbers as follows: 07551001, 07551002, 0201001, 0201002, 0101001, 0101002, 0102003, 0102004, 01231001, 01231002, 01231003, and 01231004.

The conference management systems determine the corresponding subordinate terminals in accordance with the configured number segments. In this embodiment, a number segment is used to serve as the common prefix of the numbers of terminals corresponding to the conference management systems. For example, the conference management systems with the configured number segments 0755 and 020 can manage terminals with number prefixes 0755 and 020, while the conference management systems with the configured number segment 010 can manage terminals with number prefix 010. Similarly, the conference management systems with the configured number segment 0123 can manage terminals with number prefix 0123.

The conference coordination systems are configured with number segments managed by the corresponding conference management systems and number segments managed by the neighboring conference coordination systems. For example, the conference coordination systems with the configured number segments 0086755, 008620 and 008610 can manage the conference management systems with the configured number segments 0755, 020 and 010 and thereby determine terminals corresponding to the conference management systems, i.e., determine the conference management systems corresponding to the terminals that are numbered uniformly. Similarly, the conference coordination system with the configured number segment 001123 can manage the conference management systems with the configured number segment 0123, and thereby determine the terminals corresponding to the conference management systems. The conference coordination systems that can dispatch each other are configured as "neighboring" conference coordination systems.

During a videoconference, a conference coordination system determines multiple conference management systems involved in the conference in accordance with the system configuration (terminal number, number segment configuration, etc., wherein each terminal participating in the conference is also referred to as a conference site), and splits the conference into sub-conferences and distributes them to the corresponding subordinate conference management systems (the videoconference held by each conference management system is referred to as a sub-conference of the videoconference), and determines a master conference management system and slave conference management systems dynamically in accordance with dispatching strategy. Hereinafter the conference coordination systems are described in detail with reference to the dispatching process:

The conference coordination systems determine the conference management systems or the conference coordination systems corresponding to the terminals in accordance with the terminal numbers, so as to determine the conference management systems involved in the conference. The conference coordination systems split the conference into multiple sub-conferences and then distribute them to other conference management systems.

The conference coordination systems determine the master conference management system in accordance with the corresponding strategy; for example, the conference coordination systems can determine the master conference management system (i.e., the conference management system where the master MCU is; hereinafter the master conference management system will be described in detail) in accordance with the number of terminals.

The conference coordination systems determine whether to merge sub-conferences in accordance with appropriate dispatching strategy, so as to reduce unnecessary cascades; for example, a threshold may be set, so that the terminals involved in the sub-conferences can be merged into the master conference management system directly when the number of sub-conference sites is lower than the threshold. Here, the dispatching strategy of the conference coordination systems is to determine the master conference management system in accordance with the number of terminals managed by the conference management systems and to determine whether to merge the sub-conferences into the master conference management system in accordance with the number of sub-conferences.

In addition, the master conference management system refers to the conference management system where the master MCU is when a cascade across conference management systems is required in a videoconference. The slave conference management systems refer to conference management systems that do not contain the master MCU when cascades across conference management systems are required in a videoconference. In the subordinate MCUs managed by the master conference management system, only one MCU serves as the master MCU, while the other MCUs managed by the master conference management system and the MCUs managed by the slave conference management systems serve as slave MCUs, and the master conference management system accomplishes cascading among the master and slave MCUs. In addition, "cascade" here refers to the conference mode of the master and slave MCUs cascading with each other in a videoconference, i.e., a videoconference is held based on multiple MCUs, wherein there is only one master MCU, and the other MCUs are slave MCUs; the master and slave MCUs are linked together directly through communication link connections.

During conference dispatching, when a conference management system receives conference dispatching request data, it treats the local conference site independently first (the number segment managed by each conference management system can be configured and distributed to each corresponding conference management system by a conference coordination system). If all of the conference sites are local ones, the conference management system will dispatch locally and doesn't need to interact with the conference coordination systems.

If the conference involves any conference site that does not correspond to the conference management system, the conference management system will submit the dispatching request to a conference coordination system for processing. The conference coordination system will send a sub-conference dispatching request to each corresponding conference management system or the conference coordination system (more details in the dispatching process of the conference coordination system). After all sub-conferences are dispatched successfully, the master conference management system will accomplish the cascading among the master and slave MCUs.

During a conference across multiple conference management systems, since each conference management system can only manage and control the state of the sub-conference held in itself, the conference coordination system has to route and transfer conference state data and control commands to control the entire conference and manage allocation of MCU resource, so as to ensure the resource required by the conference meet the subscribers' requirements. A conference across systems can be implemented by the conference management systems communicating with the conference coordination systems. When the conference management system does not communicate with the conference coordination system, it operates as a centralized conference management system.

Figure 6:
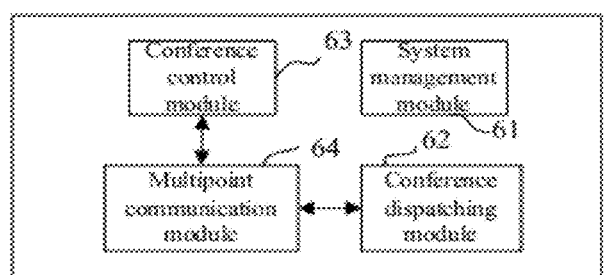
FIG. 6 is the block diagram of the conference coordination system in the videoconference system according to the first embodiment of the present invention.

In particular, each conference coordination system includes (See FIG. 6): (1) a system management module 61, for accomplishing system configuration (e.g., numbering, number segment configuration) and operating management of the conference coordination system; (2) a conference dispatching module 62, for processing conference dispatching requests from the subordinate conference management systems or the neighboring conference coordination systems; (3) a conference control module 63, for forwarding conference control data; and (4) a multipoint communication module 64, for communicating with the subordinate conference management systems and the neighboring conference coordination systems.

Figure 7:
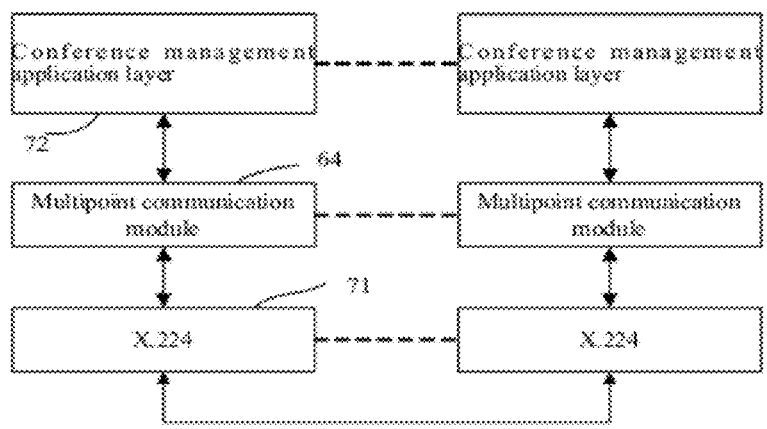
FIG. 7 is the diagram of the communication model of conference coordination system in the videoconference system according to the first embodiment of the present invention.

As shown in FIG. 7, the communication models between a conference coordination systems and the subordinate conference management systems as well as between the conference coordination systems are based on the International Organization for Standardization (ISO) 7-layer model for communication; wherein, the International Telecommunications Union transport service ITU-T X.224 is used below transport layer 71, the upper layer for the transport layer 71 is a multipoint communication module 64. The upper layer for the multipoint communication module 64 is a conference management application layer 72 (e.g., a conference dispatching module 62, a conference control module 63).

The multipoint communication data in the multipoint communication module 64 employs (but not limited to) the following format to carry upper layer data:

```
{
    source node ID,
    channel ID,
    list of destination nodes;
    application data segment mark,
    upper layer application data,
    ...
}
```

Each conference coordination system implements routing strategy by utilizing the channel ID and list of destination nodes in the multipoint communication data, so as to improve communication efficiency and facilitate modular design of upper layer applications. For example, channels with IDs of 1-1,000 can be used to transfer conference dispatching request data; channels with ID>1,000 can be used to control the conference. The conference dispatching request data can be sent directly to the conference dispatching module 62 for processing. For conference control data (including state data and control commands), the routing strategy can be configured further. For example, when the conference coordination systems do not need the conference control function, it is unnecessary to send the conference control data to the conference control module 63 in each conference coordination system. When the conference coordination systems need only billing function, the conference control module 63 can send only start/end of conference, entering/leaving of conference site etc., and billing-relevant information to the conference coordination systems; when a conference management system doesn't need to control the conference, it is unnecessary to send the conference control data to the conference management system. That is to say, the conference coordination systems perform conference control as required, besides conference dispatching across systems.

Figure 8:
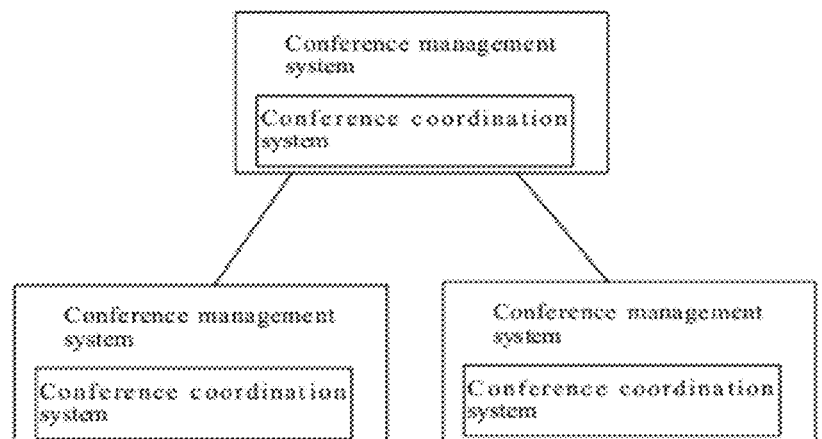
FIG. 8 is the diagram of a videoconference system according to a second embodiment of the present invention.

The conference coordination systems may be separated from the conference management systems (see FIG. 4 and FIG. 5) or embedded in the corresponding conference management systems (see FIG. 8).

Accordingly, the method for managing the videoconference system comprises the steps of: (1) a subscriber requesting for conference dispatching from the home conference management system; (2) the home conference management system processing the corresponding local conference sites directly at the dispatching request, and transferring the dispatching across conference management systems to the corresponding conference coordination system; (3) the conference coordination system dispatching the corresponding master and slave conference management systems at a dispatching request (during the conference dispatching process, the conference coordination system performing control of the conference in accordance with the conference control data and performing dispatching with reference to the dispatching strategy) by the steps of: (a) the conference coordination system determining each terminal's conference management system; (b) the conference coordination system splitting the videoconference into sub-conferences and distributing them to the corresponding conference management systems; (c) the conference coordination system determining the master conference management system and the slave conference management systems; (d) the master and slave conference management systems feeding the dispatching result back to the corresponding conference coordination system; and (e) the conference coordination system feeding the final dispatching result back to the home conference management system that sent the dispatching request.

If the dispatching request indicates to dispatch a neighboring conference coordination system, dispatching a corresponding neighboring conference coordination system in accordance with the corresponding number segment managed by it; the corresponding conference coordination system executing the dispatching step to the step of feeding the dispatching result.

Before the dispatching process, the videoconference system management method includes the steps of: (1) numbering terminals in the videoconference system uniformly; (2) the conference management systems determining corresponding terminals in accordance with the configured number segments; and (3) configuring the conference coordination systems with number segments managed by the corresponding conference management systems and number segments managed by the neighboring conference coordination systems.

Figure 9:
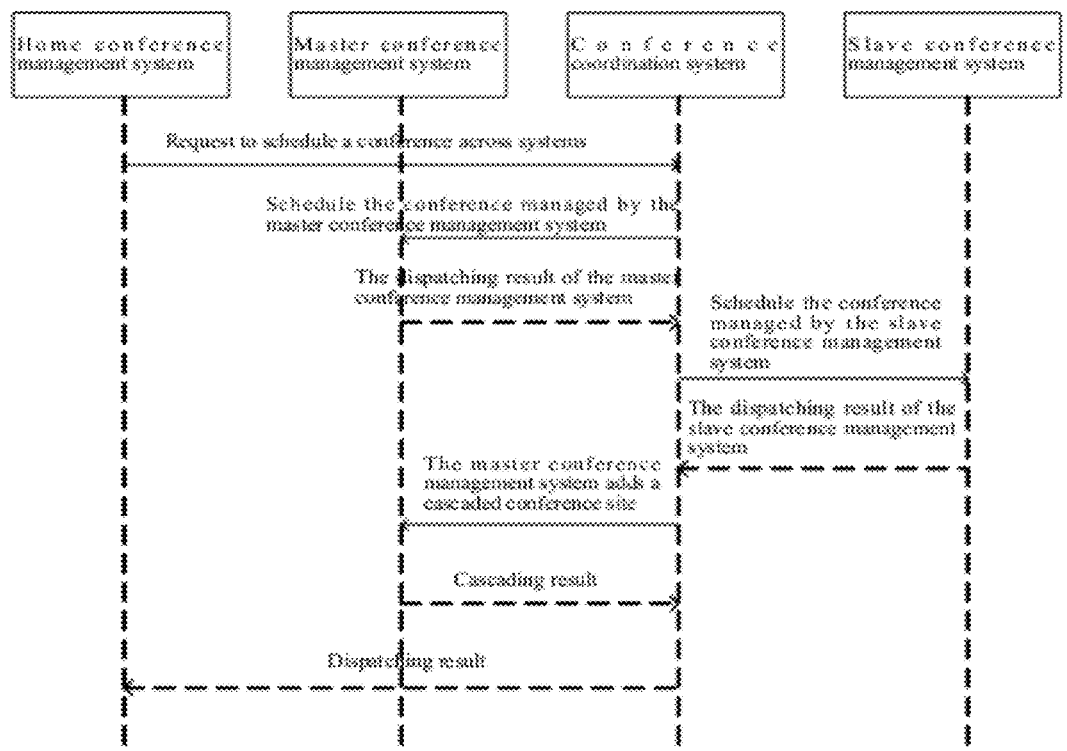
FIG. 9 is the flow diagram of the method for managing the videoconference system according to the second embodiment of the present invention.

FIG. 9 shows an embodiment of the method for managing the videoconference system. When a cascaded conference site is added across conference management systems, the method includes the following steps: (1) a subscriber requesting for conference dispatching to the home conference management system; (2) determining whether the conference dispatching request is a request across conference management systems or a local request; (3) the home conference management system processing the request, i.e., if the request is a local request, processing the corresponding local conference site; otherwise, transferring the dispatching across conference management systems to the corresponding conference coordination system; (4) the conference coordination system dispatching the corresponding master and slave conference management systems by the managed corresponding number segments in accordance with the dispatching request, conference control data, and dispatching strategy; (5) the master and slave conference management systems feeding the dispatching result back to the conference coordination system; wherein (a) the corresponding conference coordination system dispatching the master conference management system; (b) the master conference management system feeding the dispatching result back to the conference coordination system; (c) the conference coordination system dispatching the slave conference management systems in accordance with the dispatching result; (d) the slave conference management systems feeding the dispatching result back to the conference coordination system; (e) the conference coordination system dispatching the master conference management system to add a cascaded conference site; (f) the master conference management system feeding the cascading result back to the conference coordination system; and (g) the conference coordination system feeding the final dispatching result back to the home conference management system that sent the dispatching request.

If the dispatching request indicates to dispatch a neighboring conference coordination system, dispatching a corresponding neighboring conference coordination system is dispatched in accordance with the corresponding number segment managed by it; the corresponding conference coordination system executing corresponding dispatching process.

During a videoconference, the process of adding a terminal or prolonging the videoconference is similar to the process of adding a cascaded conference site across conference management systems, which will not be described in further detail.

In conclusion, compared with the conventional art, the videoconference system and the management method thereof according to the embodiments of the present invention employ a cascaded and distributed conference management to implement dispatching for the entire conference across the entire network, and thereby optimize the operator's network configuration, improve equipment utilization, and reduce investment cost; in addition, the videoconference system and the management method thereof can implement automatic cascading and hold any large-scale videoconference efficiently and quickly, without any need to designate a dedicated person to perform conference dispatching and control, thereby can easily implement networking across operators and across countries to meet the demand for public videoconference operation; through conference dispatching by number segments and thresholds of terminals, the videoconference system and the management method thereof can make utilization of MCU and network resources more logical.

What is claimed is:

1. A videoconference system, comprising:
    terminals;
    multipoint control units (MCUs), as a superior level for the terminals, for controlling the corresponding terminals to participate in a videoconference;
    conference management systems, as a superior level for the MCUs, for managing resource allocation of the corresponding MCUs, and performing conference dispatching and control for a local conference site; and
    conference coordination systems, as a superior level for the conference management systems, for determining the conference management systems or the conference coordination systems corresponding to the terminals in accordance with the terminal numbers, splitting the conference into multiple sub-conferences and then distributing the sub-conferences to other conference management systems;
    wherein after distributing the sub-conferences to the other conference management systems, the conference coordination system determines a master conference management stem in accordance with the corresponding strategy; and then determines whether to merge sub-conferences in accordance with appropriate dispatching strategy so as to reduce unnecessary cascades.

2. The videoconference system according to claim 1, wherein at least one of the following information is adapted to determine the conference management systems or the conference coordination systems corresponding to the terminals in accordance with the terminal numbers, split the conference into the multiple sub-conferences and distribute the sub-conferences to the other conference management systems:

the terminals being numbered uniformly;

the conference management system being configured with number segments to determine corresponding terminals; and the conference coordination systems being configured with the number segments managed by the corresponding conference management systems and number segments managed by the neighboring conference coordination system.

3. The videoconference system according to claim 1, wherein the dispatching strategy of the conference coordination systems is to determine the master conference management system in accordance with the number of terminals managed by the conference management systems and to determine whether to merge the sub-conferences into the master conference management system in accordance with the number of the sub-conferences.

4. The videoconference system according to claim 1, wherein the conference coordination systems are separated from or embedded in the conference management systems.

5. A videoconference system management method, comprising the steps of:

requesting for conference dispatching from home conference management systems;

managing, by the home conference management systems, the corresponding local conference site directly in response to the dispatching request, or transferring the dispatching across conference management systems to a corresponding conference coordination system; and implementing, by the conference coordination system as a superior level for the conference management systems, the coordinating step:

determining multiple conference management systems involved in the conference in accordance with the system configuration, splitting the conference into sub-conferences, and distributing them to the corresponding conference management systems;

determining, by the conference coordination system a master conference management system and slave conference management systems dynamically in accordance with dispatching strategy;

wherein before the step of requesting for conference dispatching, the method further comprises the following steps:

numbering terminals in the videoconference uniformly;

configuring the conference management systems with number segments to determine corresponding terminals; and configuring the conference coordination system with the number segments managed by the corresponding conference management systems and number segments managed by the neighboring conference coordination system, so that the conference coordination system can perform dispatching in accordance with the corresponding managed number segments.

6. The videoconference system management method according to claim 5, wherein after the coordinating step, the method further comprising the following steps:

feeding, by the master and slave conference management systems, a coordinating result back to the corresponding conference coordination systems; and feeding, by the conference coordination systems one or more final coordinating results back to the home conference management systems that send the dispatching requests.

7. The videoconference system management method according to claim 5, wherein after the coordinating step, the conference coordination systems perform conference dispatching with reference to a dispatching strategy, and the dispatching strategy is: to determine the master conference management system in accordance with the number of terminals managed by each conference management system and determine whether to merge the sub-conferences into the master conference management system in accordance with the number of the sub-conferences.

8. The videoconference system management method according to claim 5, wherein the dispatching request refers to that the subscriber requests for conference dispatching from the conference management system where the account number of a conference caller is, including a start time, a duration of the conference and terminals involved in the conference.

* * * * *

UNITED STATES PATENT AND TRADEMARK OFFICE
CERTIFICATE OF CORRECTION

PATENT NO. : 8,310,518 B2  
APPLICATION NO. : 12/697775  
DATED : November 13, 2012  
INVENTOR(S) : Zhang et al.

Page 1 of 1

It is certified that error appears in the above-identified patent and that said Letters Patent is hereby corrected as shown below:

Column 10, line 57, "stem" should read -- system --.

Signed and Sealed this
Nineteenth Day of March, 2013

Teresa Stanek Rea
*Acting Director of the United States Patent and Trademark Office*